United States Patent [19]

Smallbrook et al.

[11] Patent Number: 4,550,460
[45] Date of Patent: Nov. 5, 1985

[54] AIR BRAKE SLACK ADJUSTMENT AND MEASUREMENT TOOLS

[76] Inventors: Henry C. Smallbrook, 19255 Baker Rd., Bend, Oreg. 97702; William E. Spicer, 2271 Key Cir., Sparks, Nev. 89431

[21] Appl. No.: 510,549

[22] Filed: Jul. 5, 1983

[51] Int. Cl.⁴ .............................................. B25F 11/00
[52] U.S. Cl. ....................................................... 7/164
[58] Field of Search ........................... 7/164, 166, 169; 81/3 R, 90 B, 90 C

[56] References Cited

U.S. PATENT DOCUMENTS

| | | | |
|---|---|---|---|
| 585,123 | 6/1897 | Severance | 7/166 |
| 1,939,833 | 12/1933 | Schwartz et al. | 7/164 X |
| 4,064,613 | 12/1977 | Simms | 81/3 R X |
| 4,089,077 | 5/1978 | Morton | 7/166 X |
| 4,164,935 | 8/1978 | Stoops | 81/90 C X |

Primary Examiner—James G. Smith
Attorney, Agent, or Firm—Paul L. Hickman

[57] ABSTRACT

Air brake adjustment and measurement tools where the adjustment tool includes a long handle portion having a gripper assembly attached to one end and a socket wrench drive attached to the other end. The gripper assembly has a pair of facing jaw members adapted to engage opposing edges of a vehicle's air brake slack adjustment. The measuring tool includes a scale, and a permanent magnet attached to one end of the scale. In use, the measuring tool is placed next to the clevis rod of the vehicle's air brake assembly, and the adjustment tool is used to move the air brake slack adjustment between a braking and a non-braking position. The stroke of the clevis rod is measured by the measuring tool, and is adjusted by a socket wrench attached to a socket drive of the adjustment tool.

7 Claims, 8 Drawing Figures

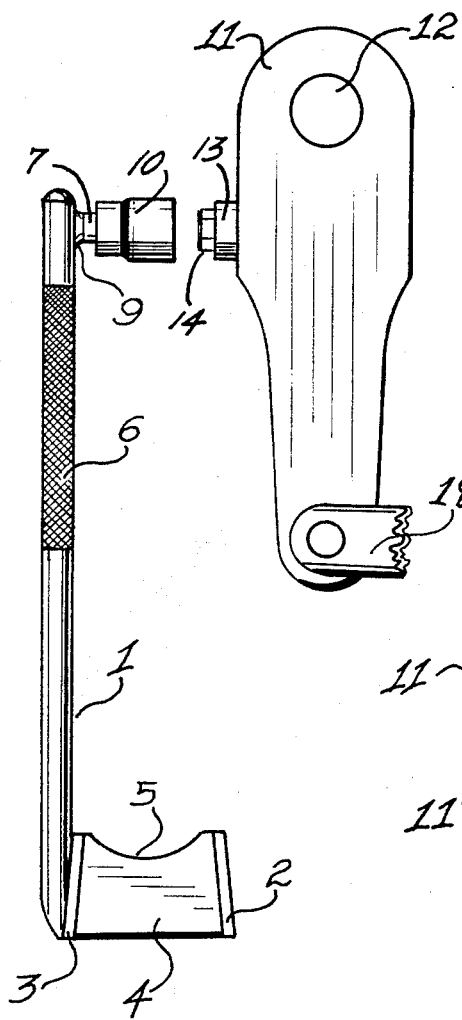
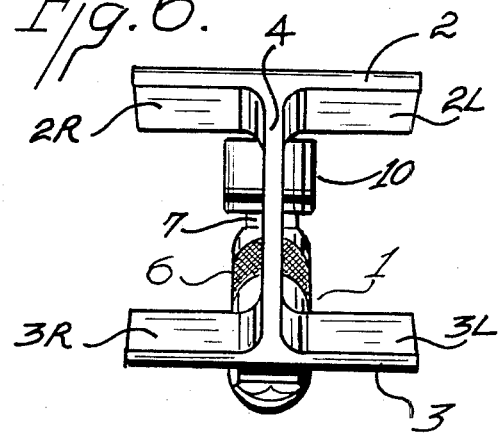
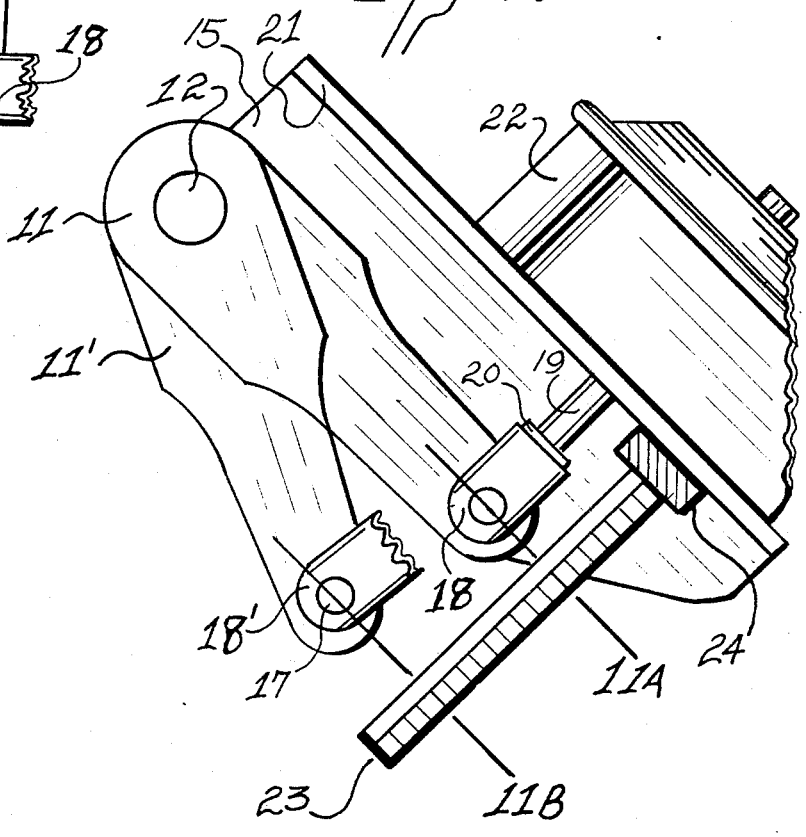

AIR BRAKE SLACK ADJUSTMENT AND MEASUREMENT TOOLS

BACKGROUND OF THE INVENTION

1. Field of the Invention

This invention relates generally to hand tools, and more particularly to hand tools used to adjust the brake mechanism of a motor vehicle.

2. Description of the Prior Art

Large motorized vehicles such as multiple-wheeled trucks often use air brakes on their rear wheels. A typical air brake assembly includes a mounting bracket, an air brake chamber attached to the bracket, a clevis rod extending from the air brake chamber, and an air brake slack adjustment having one end pivotably supported by the bracket and having its other end pivotably attached to end of the clevis rod. The air brake chamber includes a diaphragm which is exposed to atmospheric pressure on one side and which is coupled to a pressurized air source on its other side. When air pressure is applied to the air brake chamber, the diaphragm causes the clevis rod to extend outwardly from the air brake chamber to pivot the air brake slack adjustment from a non-braking position to a braking position. The distance that the clevis rod moves between the non-braking and braking position is known as the clevis rod stroke.

As the brake linings wear, the air brake slack adjustment must be adjusted to maintain the clevis rod stroke within specified limits. Thus, it is necessary for a large vehicle operator to periodically check and readjust the air brake slack adjustments of the vehicle to maintain the clevis rod stroke within a specified range.

A problem is encountered during the aforementioned procedure in that it is difficult to manually move the air brake slack adjustment between its non-braking and its braking position. Located within the air brake chamber is a strong compression spring which biases the clevis rod towards the air brake chamber and thus its non-braking position. It is very difficult to manually overcome this biasing force and to simultaneously measure the stroke of the clevis rod.

Some maintenance manuals recommend that the mechanic performing the adjustment procedure disconnect the pressure hose from the air brake chamber and connect the air brake chamber to an 80 PSI air pressure source to cause the clevis rod to move to its braking position. This method for moving the clevis rod from its non-braking to its braking position is, however, inconvenient and requires compressors or other special equipment.

Most commonly, a mechanic will attempt to move the air brake slack adjustment with one hand, and measure the length of the clevis rod stroke with a ruler held in his other hand. This tiresome two-handed operation is made even more difficult by the cramped quarters around the air brake mechanism in which the mechanic must work.

What the prior art fails to disclose is a simple, manually operated tool for pivoting the air brake slack adjustment between its braking and non-braking position and for measuring the clevis rod stroke. Furthermore, the prior art does not disclose a pair of tools which allow the clevis rod stroke to be measured and adjusted with one hand.

SUMMARY OF THE INVENTION

A major object of this invention is to provide a pair of simple, manual tools for measuring and adjusting the air brake slack adjustment of a vehicle's air brake assembly.

A further object of this invention is to provide a multi-purpose adjustment tool which can both aid in the measurement of the clevis rod stroke and which can further be used to adjust the adjustment screw on the air brake slack adjustment.

Yet another object of this invention is to provide air brake measurement and adjustment tools that only require one hand to operate.

Briefly, the invention comprises an adjustment tool and a measuring tool. The adjustment tool includes an elongated handle portion, a gripper assembly attached to one end of the handle portion, and a drive member attached to the other end of the handle portion. The gripper assembly includes an inner jaw member attached to the handle, an outer jaw member spaced from the inner jaw member, and a connector member coupling the outer jaw member to the inner jaw member. Preferably the connector member is substantially trapezoidal in shape and the two jaw members are attached to opposing non-parallel edges of the connector member such that they are angled towards each other. The socket wrench drive is adapted to hold a standard socket wrench which engages the adjustment screw of the air brake slack adjustment.

The measuring tool includes an elongated scale and a permanent magnet attached to one end of the scale to hold the scale substantially parallel to the air brake assembly's clevis rod. The scale is used to measure the length of the stroke of the clevis rod as it moves from a non-braking to a braking position.

In use, the magnet of the measuring tool is placed against a portion of the air brake assembly such that the scale portion is substantially parallel to the clevis rod. The gripper assembly of the adjustment tool is engaged with opposing edges of the vehicle's air brake slack adjustment, such that torque applied to the handle will move the air brake slack adjustment and the clevis rod between their braking and non-braking positions. The stroke of the clevis rod is read directly from the scale. If the stroke is too long or too short, a socket wrench is engaged with the socket wrench drive of the adjustment tool and the adjustment screw of the air slack adjustment is rotated until the clevis rod stroke is within its proscribed limits.

An advantage of this invention is that a pair of simple, manual tools can be used to properly adjust the clevis rod stroke of a vehicle's air brake assembly.

Another advantage of this invention is that a mechanic can measure and adjust the clevis rod stroke while using only one hand.

These and other objects and advantages of the present invention will no doubt become apparent upon a reading of the following descriptions and a study of the several figures of the drawing.

BRIEF DESCRIPTION OF THE DRAWING

FIG. 5 is an elevational view of the air brake adjustment tool of FIGS. 1-4, and of a portion of a vehicle's air brake assembly.

FIG. 6 is side elevational view of FIG. 3.

FIG. 7 is a partial view of a vehicle's air brake assembly with the measuring tool of the present invention.

DETAILED DESCRIPTION OF THE PREFERRED EMBODIMENT(S)

Figure 1:
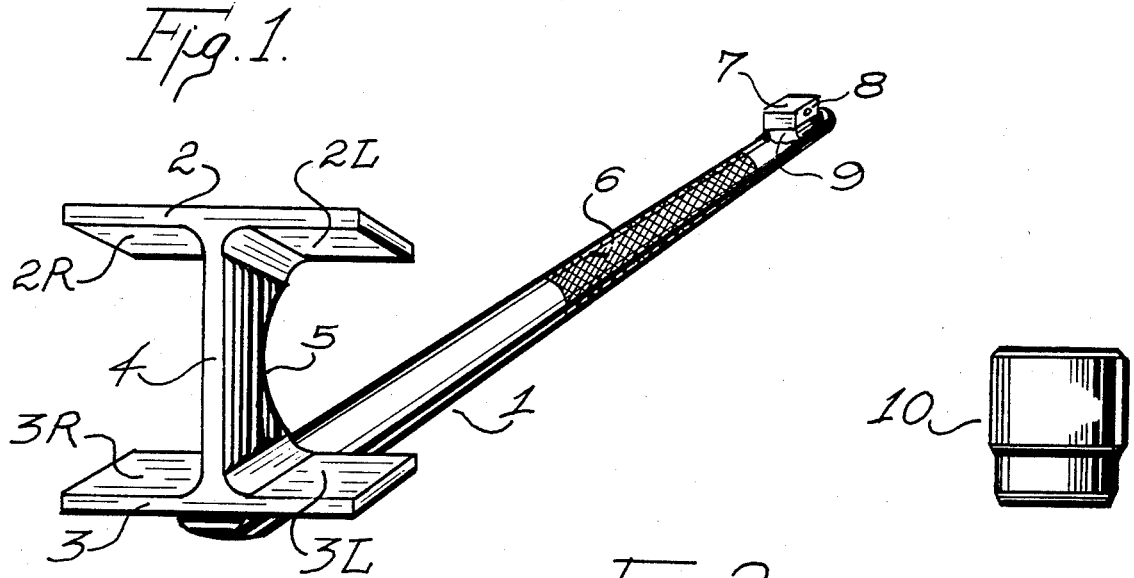
FIG. 1 is a perspective view of an air brake adjustment tool in accordance with the present invention.

Referring to FIGS. 1-4 and 6, an air brake adjustment tool in accordance with the present invention includes an elongated handle 1 provided with a gripper portion at one end and a socket wrench drive at the other end. The gripper portion includes an outer jaw member 2, an inner jaw member 3, and a connector member 4. Inner jaw member 3 is attached to the tapered end of handle 6, preferably by welding.

Figure 3:
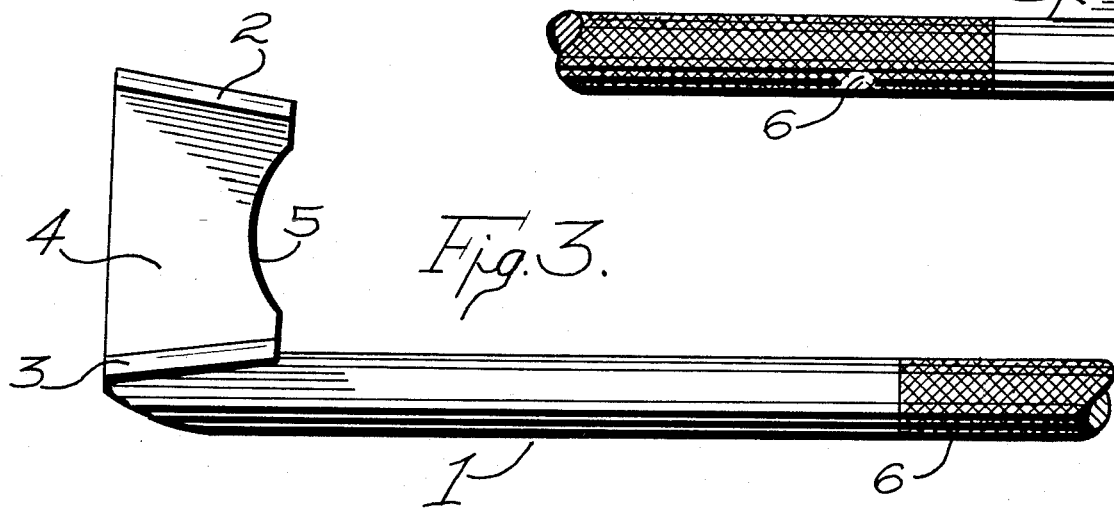
FIG. 3 is a partial, elevational view of the other end of the tool shown in FIG. 1.

As best seen in FIG. 3, connector member 4 is substantially trapezoidal in shape having two non-parallel edges of substantially equal length and two parallel edges of different lengths. The shorter of the two parallel edges of connector member 4 is provided with an arc shaped relief 5 for a purpose to be discussed subsequently.

As seen in the figures, jaw members 2 and 3 are attached to the opposing, non-parallel edges of connector member 4. Thus, the two jaw members are angled towards each other in the direction of the handle 1. As best seen in FIGS. 1 and 6, connector member 4 is attached to mid-length portions of jaw members 2 and 3, preferably by weldments or the like.

Referring once again to FIGS. 1 and 6, the attachment of the connector member 4 to the jaw members 2 and 3 divides the jaw members into left side portions and right side portions. More specifically, portion 2L of jaw member 2 and portion 3L of jaw member 3 are the left side portion of the gripper member, and portion 2R of jaw member 2 and portion 3R of jaw member 3 are the right hand portion of the gripper member. The significance of the left side portion and the right side portion of the gripper member will be discussed subsequently with reference to the operation of this device.

Handle portion 1 is preferably provided with a grip area 6 which, in the illustrated embodiment, is created by knurling a portion of handle 1 that is distal from the gripper member. Of course, other grips could be provided, such as a rubber or plastic sleeve around all or a portion of handle 1.

Figure 2:
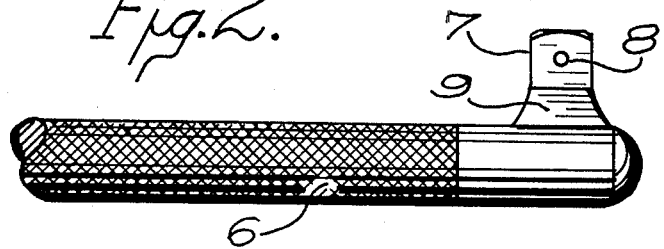
FIG. 2 is a partial, elevational view of one end of the tool shown in FIG. 1.
Figure 4:
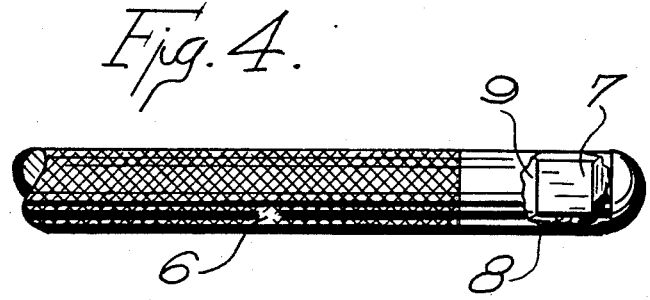
FIG. 4 is a top plan view of FIG. 2.

Referring now more specifically to FIGS. 1, 2, and 4, a socket wrench square drive 7 is attached to an opposing end of handle 1, preferably by a weldment 9. The square drive 7 is preferably beveled on the top, as shown in FIG. 2, and is provided with a detent mechanism 8. Square drive 7 is preferably a standard ⅜" drive, and is attached at substantially right angles to the length of handle 1. As seen in FIG. 2, a standard socket wrench 10 can engage square drive 7 for purposes to be discussed subsequently.

In FIG. 5, an air brake assembly's air brake slack adjustment 11 is shown to be pivotably supported by a slack adjustment pin 12. Attached to the side of slack adjustment 11 is a locking sleeve 13 and an adjustment screw 14. The locking sleeve 13 is coaxially disposed around adjustment screw 14 and is axially movable between a locking position and a non-locking position. When socket wrench 10 is engaged with square drive 7 of the present invention, adjustment screw 14 can engage the inner faces of socket wrench 10 while the outer rim of the socket wrench pushes sleeve 13 axially towards air brake slack adjustment 11 to its unlocked position. Then, by applying torque to handle 1, the air brake slack adjustment may be adjusted.

Referring now to FIG. 7, a vehicle's air brake assembly further includes a mounting bracket 15, a clevis pin 17 attaching a clevis 18 to air brake slack adjustment 11, a clevis rod 19, a connector 20 attaching an end of clevis rod 19 to clevis 18, a mounting bracket flange 21, and an air brake chamber 22 attached to mounting bracket flange 21.

Disposed within air brake chamber 22 is a diaphragm (not shown) which causes clevis rod 19 to move between its braking and its non-braking position. A strong compression spring (also not shown) within the air brake chamber 22 biases the clevis rod 19 towards its static or non-braking position. The stroke of clevis rod 19 is indicated by the distance between lines 11A and 11B. At 11A, clevis rod 19, clevis 18, and air brake slack adjustment 11 are at their static or non-braking position. At position 11B, clevis rod 19, clevis 18, and air brake slack adjustment 11 are in their braking position.

Also shown in FIG. 7 is the measuring tool of the present invention. The tool includes a scale portion 23 provided with a number of gradations, and a permanent magnet 24 attached to one end of scale 23. The exposed face of magnet 24 is preferably at substantially right angles to the length of scale 23. In use, magnet 24 attaches either to mounting bracket 15 or bracket 21 such that scale 23 is substantially parallel to clevis rod 19. It should be noted that the stroke of clevis rod 19 is not quite parallel to scale 23, but the amount of deviation is not substantial enough to make a difference to the measurement.

Figure 8:
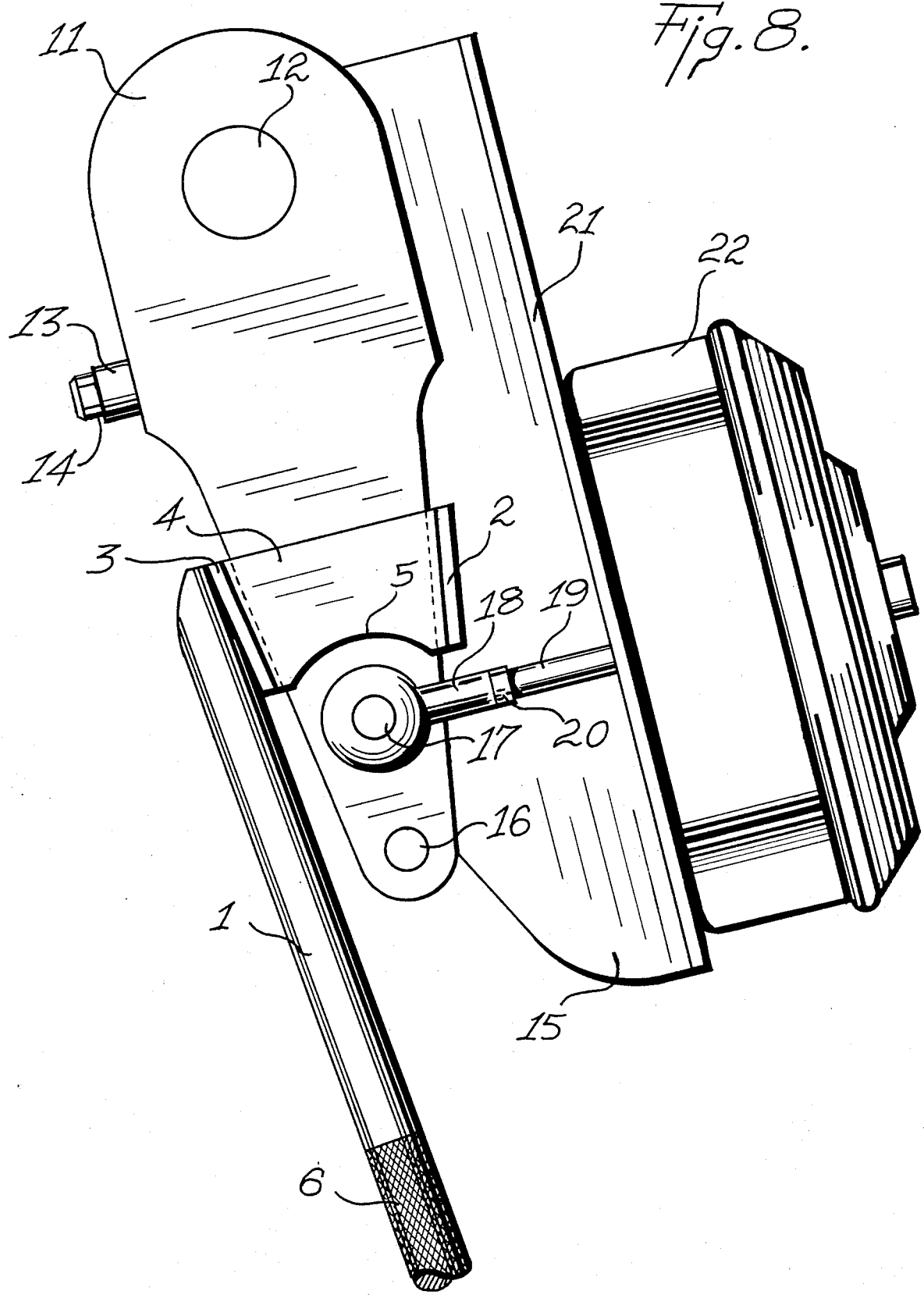
FIG. 8 is an elevational view of a vehicle's air brake assembly with the gripper portion of the air brake adjustment tool engaged with the air brake slack adjustment.

In FIG. 8, an air brake adjustment tool of the present invention is shown to be engaged with the air brake slack adjustment 11 of a slightly different air brake assembly. In this assembly type, clevis 18 is eyebolt shaped, as shown, and a hole 16 is provided at a lower extremity of air brake slack adjustment 11 to provide additional travel adjustment of the clevis rod. Arc shaped relief 5 is provided in connector member 4 to allow the gripper assembly of the tool to be placed as far down as possible on air brake slack adjustment 11 to provide the greatest mechanical advantage. As can be seen in the figure, jaw member 2 and jaw member 3 engage opposing edges of air brake slack adjustment 11 such that torque exerted on handle 1 will easily pull clevis rod 19 to its extended or non-braking position against the biasing force of the spring within air brake chamber 22.

In operation, and with special reference to FIGS. 7 and 8, the measuring device 23/24 is first placed in position next to clevis rod 19, and jaws 2 and 3 of the gripper portion of the adjustment tool are engaged with opposing edges of air brake slack adjustment 11. Torque is then applied to handle 1 at grip 6 to move the air brake slack adjustment against the biasing force of the spring within air brake member 22 from the non-braking position shown in FIG. 7 at 11/18 to a non-braking position shown at 11'/18'. The stroke of clevis rod 19 is determined by subtracting the measurements taken at 11A and 11B along scale 23. If the travel or stroke of clevis rod 19 is out of the recommended range, air brake slack adjustment 11 can be adjusted by adjustment screw 14, as was previously described with reference to FIG. 5. The measurement procedure is then repeated to ensure that the newly adjusted clevis rod stroke is within the prescribed range.

The air brake adjustment tool of FIG. 8 is engaged with the air brake slack adjustment of a right-side air brake assembly. Thus, portions 2R and 3R of jaw members 2 and 3, respectively, are engaged with the edges of the air brake slack adjustment 11. On the other side of the truck, the situation would be reversed with portions 2L and 3L of jaws 2 and 3, respectively, engaging the opposing edges of air brake slack adjustment 11 of a left-side air brake assembly.

While this invention has been described in terms of a few preferred embodiments, it is contemplated that persons reading the preceding descriptions and studying the drawing will realize various alterations, permutations and modifications thereof. It is therefore intended that the following appended claims be interpreted as including all such alterations, permutations and modifications as fall within the true spirit and scope of the present invention.

What is claimed is:

1. An air brake adjustment tool for an air brake assembly including an air brake chamber, a slack adjustment pivotally supported at a first end thereof, and a clevis rod extending from said air brake chamber and pivotally attached at to a second end of said slack adjustment, said tool comprising: adjustment means having a handle portion and a gripper portion attached to said handle portion and adapted to engage said slack adjustment to move said slack adjustment between a braking position and a non-braking position, said gripper portion including a separated pair of jaw members attached to a first end of said handle and adapted to engage opposing edges of said slack adjustment, said jaw members being angled towards each other, said pair of jaw members of said gripper portion including a substantially planar inner jaw member coupled to said first end of said handle and a substantially planar outer jaw member, said gripper portion further comprising a connector member coupling said outer jaw member to said inner jaw member, said connector member being substantially planar and attached to said inner jaw member and said outer jaw member at substantially right angles, said connector member being substantially trapezoidal in shape having two, opposing parallel edges and two, opposing non-parallel edges, and wherein said inner jaw member is attached to a first of said non-parallel edges, and said outer jaw member is attached to a second of said non-parallel edges.

2. An air brake adjustment tool as recited in claim 1 wherein the longer of said parallel edges of said connector is proximate said first end of said handle, and the shorter one of said parallel edges of said connector is relatively distal said first end of said handle.

3. An air brake adjustment tool as recited in claim 2 wherein said shorter parallel edge of said connector is provided with an arc-shaped relief.

4. An air brake adjustment tool as recited in claim 3 wherein said inner jaw member and said outer jaw member are substantially rectangular, and wherein said connector member is attached to said inner jaw member and said outer jaw member approximately midway to their length.

5. An air brake adjustment tool as recited in claim 4 wherein said handle portion is provided with a grip section proximate a second end thereof.

6. An air brake adjustment tool as recited in claim 1 further comprising a square drive member coupled to said handle portion proximate a second end thereof, said square drive member being at substantially right angles to said handle.

7. An air brake adjustment tool as recited in claim 6 wherein said square drive member is provided with a detent mechanism.

* * * * *